(12) United States Patent
Choi (10) Patent No.: US 8,397,900 B2
(45) Date of Patent: Mar. 19, 2013

(54) TRAVERSE SYSTEM

(75) Inventor: Jeongho Choi, Busan (KR)

(73) Assignee: Hyundai Motor Company, Seoul (KR)

( * ) Notice: Subject to any disclaimer, the term of this patent is extended or adjusted under 35 U.S.C. 154(b) by 704 days.

(21) Appl. No.: 12/616,228

(22) Filed: Nov. 11, 2009

(65) Prior Publication Data

US 2010/0316477 A1    Dec. 16, 2010

(30) Foreign Application Priority Data

Jun. 15, 2009  (KR) ........................ 10-2009-0052987

(51) Int. Cl.
  *B65G 47/84*    (2006.01)
(52) U.S. Cl. ........... 198/465.1; 198/468.01; 198/750.11; 198/750.2; 198/772; 793/35 A
(58) Field of Classification Search ............... 198/465.1, 198/468.01, 750.11, 750.2, 772; 193/35 A
See application file for complete search history.

(56) References Cited

U.S. PATENT DOCUMENTS

| | | | | |
|---|---|---|---|---|
| 3,888,366 A | * | 6/1975 | Prahst ........................... | 414/527 |
| 4,037,714 A | * | 7/1977 | Koepke ....................... | 198/774.3 |
| 4,505,380 A | * | 3/1985 | McLemore et al. ....... | 198/750.7 |
| 4,633,784 A | * | 1/1987 | Hoehn et al. ................ | 104/162 |
| 4,768,646 A | * | 9/1988 | Devins ......................... | 198/718 |
| 5,465,827 A | * | 11/1995 | Nakagawa et al. ........ | 198/465.3 |
| 5,483,876 A | * | 1/1996 | Davis et al. .................. | 100/207 |
| 6,253,907 B1 | * | 7/2001 | Lachmann et al. ...... | 198/750.14 |
| 6,302,261 B1 | * | 10/2001 | Gilberti et al. ............ | 198/465.1 |
| 6,318,546 B2 | * | 11/2001 | Koegler .................... | 198/867.14 |
| 6,814,218 B2 | * | 11/2004 | Nishihara .................. | 198/465.1 |
| 6,986,417 B2 | * | 1/2006 | Nishizawa et al. ...... | 198/370.01 |
| 7,189,049 B1 | * | 3/2007 | Blomgren et al. ......... | 414/751.1 |
| 7,658,276 B2 | * | 2/2010 | Wegkamp .................. | 198/750.2 |
| 7,793,771 B2 | * | 9/2010 | Thues et al. ............. | 198/370.07 |
| 8,162,585 B2 | * | 4/2012 | Tsujimoto et al. ........... | 414/273 |
| 2002/0070099 A1 | * | 6/2002 | Neely ........................ | 198/750.1 |
| 2003/0226739 A1 | * | 12/2003 | Goussev .................... | 198/465.1 |
| 2010/0322752 A1 | * | 12/2010 | Ueda et al. .................... | 414/659 |
| 2012/0034056 A1 | * | 2/2012 | Schmidgall .................. | 414/502 |
| 2012/0070255 A1 | * | 3/2012 | Tsujimoto et al. ............ | 414/267 |
| 2012/0189411 A1 | * | 7/2012 | Yoshinaga .................... | 414/273 |

FOREIGN PATENT DOCUMENTS

| | | |
|---|---|---|
| JP | 05-069919 A | 3/1993 |
| JP | 2000-281209 A | 10/2000 |
| KR | 10-2000-0057471 | 9/2000 |

\* cited by examiner

*Primary Examiner* — Joseph A Dillon, Jr.
(74) *Attorney, Agent, or Firm* — Edwards Wildman Palmer LLP; Peter F. Corless (57) ABSTRACT

A traverse system for transporting a moving cart to working lines includes a base frame disposed along moving direction of the moving cart, a shuttle unit comprising a plurality of roller rotatably disposed on the base frame and a cover plate, and a moving unit disposed on the shuttle unit and configured to reciprocate along the base frame by operation of a cylinder so as to transport the moving cart.

11 Claims, 11 Drawing Sheets

TRAVERSE SYSTEM

CROSS-REFERENCE TO RELATED APPLICATION

This application claims priority to and the benefit of Korean Patent Application No. 10-2009-0052987 filed on Jun. 15, 2009, the entire contents of which are incorporated herein by reference.

BACKGROUND (a) Technical Field

The present disclosure relates to a traverse system for transporting a moving cart stably using a cylinder in a cost-effective way.

(b) Related Art

Generally, about 20,000 to 30,000 parts/components are assembled and welded to manufacture a vehicle.

In a vehicle manufacturing line, vehicle body frames or vehicle parts/components are transported by a moving cart, and the moving cart is disposed at storage in the initial process and then moved to working lines by a traverse system.

Typically, the traverse system is provided with a driving unit including a gear box, a driving motor and a roller for transporting the moving cart to working lines.

However, conventional traverse systems require a plurality of driving units, which increases manufacturing costs.

In addition, since they require rollers, rapid movement is not possible and transporting efficiency is reduced.

Also, they require additional guide units for stable transporting, so that total size of the traverse system is increased, and lots of elements are used, so that maintenance time and cost are increased.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a traverse system for transporting a moving cart to working lines comprising a base frame, a shuttle unit, and a moving unit. The base frame is disposed along moving direction of the moving cart. The shuttle unit comprises a plurality of rollers which are rotatably disposed on the base frame and a cover plate which is disposed on the base frame and through which the rollers are protruded. The moving unit is disposed on the shuttle unit and reciprocates along the base frame by operation of a cylinder so as to transport the moving cart.

The moving unit may comprise a moving frame, a moving cylinder, and a plurality of moving cart clamping units. The moving frame is disposed on the shuttle unit for reciprocating along the base frame. The moving cylinder is disposed on the base frame and comprises a moving cylinder rod connected to the moving frame. The moving cart clamping units are arranged on the moving frame for selectively clamping the moving cart to be transported on the shuttle unit.

Each of the moving cart clamping units may comprise mounting frames, a mounting block, a clamping cylinder, a moving cart clamper, and a claiming pad. The frames are disposed apart from each other on the moving frame. The mounting block is provided to the mounting frame. The clamping cylinder comprises a clamping cylinder rod and is disposed under the mounting block. The moving cart clamper is hingedly connected to the mounting block. A lower part of the moving cart is hingedly connected to a first link hingedly conned to a second link. The clamping pad is provided inside the moving cart clamper.

The shuttle unit may further comprise a plurality of floating stopper units which temporarily fix the moving cart transported by the moving unit on the base frame.

Each of the floating stopper units may comprises: a plurality of fixing blocks disposed apart from each other on the base frame; a stopper which is hingedly connected to the fixing block and a contact roller, which is configured to an end of the stopper for contacting to the moving cart; and an elastic member that connects the fixing block and the stopper for supplying elastic force to the stopper.

The traverse system may further comprise a guide unit that is disposed between the shuttle unit and the moving unit for guiding movement of the moving frame. The guide unit may comprise: a guide beam disposed along length direction of the base frame; an upper guide roller formed to the mounting frame and contacting an upper portion of the guide beam; and a side guide roller formed to the mounting frame and contacting a side portion of the guide beam.

The traverse system may further comprise first and second ejecting units which are perpendicularly or substantially perpendicularly disposed to the ends of the base frame and respectively transport the moving cart to and from the shuttle unit.

The first and second ejecting units, respectively, may comprise: first and second fixing frames disposed to the end of the base frame; and first and second driving units that comprise first and second driving motor disposed to the first and second fixing frames and first and second driving rollers connected to the first and second driving motors for transporting the moving cart to and from the first and second fixing frames.

The first and second ejecting units, respectively, may further comprise first and second moving cart holding units that are disposed to ends of the first and second fixing frames for the moving cart to be positioned on the first and second fixing frames.

The first and second moving cart holding units, respectively, comprise: first and second locators configured to the ends of the fixing frame; first and second holding cylinders comprising a holding cylinder rod and disposed to the first and second locators; and first and second holding clampers hingedly connected to an end of the holding cylinder rod and the locator.

The traverse system may further comprise a damping unit that is configured to the base frame for reducing impact induced by operation of the moving cylinder to the moving frame when the moving unit moves.

The damping unit may comprise: a housing disposed to the base frame and provided with an insertion hole thereto; an absorber rod slidably inserted in the housing wherein ends of the absorber rod are protruded from the insertion hole; and an absorber that is slidably connected to the absorber rod in the housing.

The damping unit may further comprise a protruding portion that is protruded from one side of the housing and a partition for forming inner spaces.

The damping unit may further comprise a contact bracket disposed to the moving frame for contacting the end of the absorber rod to be slided.

Reference numerals set forth in the Drawings includes reference to the following elements as further discussed below.

| | |
|---|---|
| 1: traverse system | 3: moving cart |
| 100: shuttle unit | 110: base frame |
| 111: roller | 113: cover plate |
| 120: floating stopper unit | 121: fixing block |
| 123: stopper | 124: contact roller |
| 125: elastic member | 200: moving unit |
| 210: moving frame | 220: moving cylinder |
| 222: moving cylinder rod | 230: moving cart clamping unit |
| 231: mounting frame | 232: clamping cylinder rod |
| 233: mounting block | 234: first link |
| 235: clamping cylinder | 236: second link |
| 237: clamper | 239: clamping pad |
| 240: guide unit | 241: guide beam |
| 243: upper guide roller | 245: side guide roller |
| 300: first ejecting unit | 310: first fixing frame |
| 320: first driving unit | 321: first driving motor |
| 323: first driving roller | 330: first moving cart holding unit |
| 331: first locator | 333: first holding cylinder |
| 334, 434: holding cylinder rod | 335: first holding clamper |
| 400: second ejecting unit | 410: second fixing frame |
| 420: second driving unit | 421: second driving motor |
| 423: second driving roller | 430: second moving cart holding unit |
| 431: second locator | 433: second holding cylinder contact roller |
| 435: second holding clamper | 500: damping unit |
| 510: housing | 511: inner space |
| 513: insertion hole | 515: protruding portion |
| 517: partition | 519: penetration hole |
| 520: absorber rod | 530: absorber |
| 540: contact bracket | |

DETAILED DESCRIPTION OF THE EMBODIMENTS

Reference will now be made in detail to the preferred embodiment of the present invention, examples of which are illustrated in the drawings attached hereinafter, wherein like reference numerals refer to like elements throughout.

While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
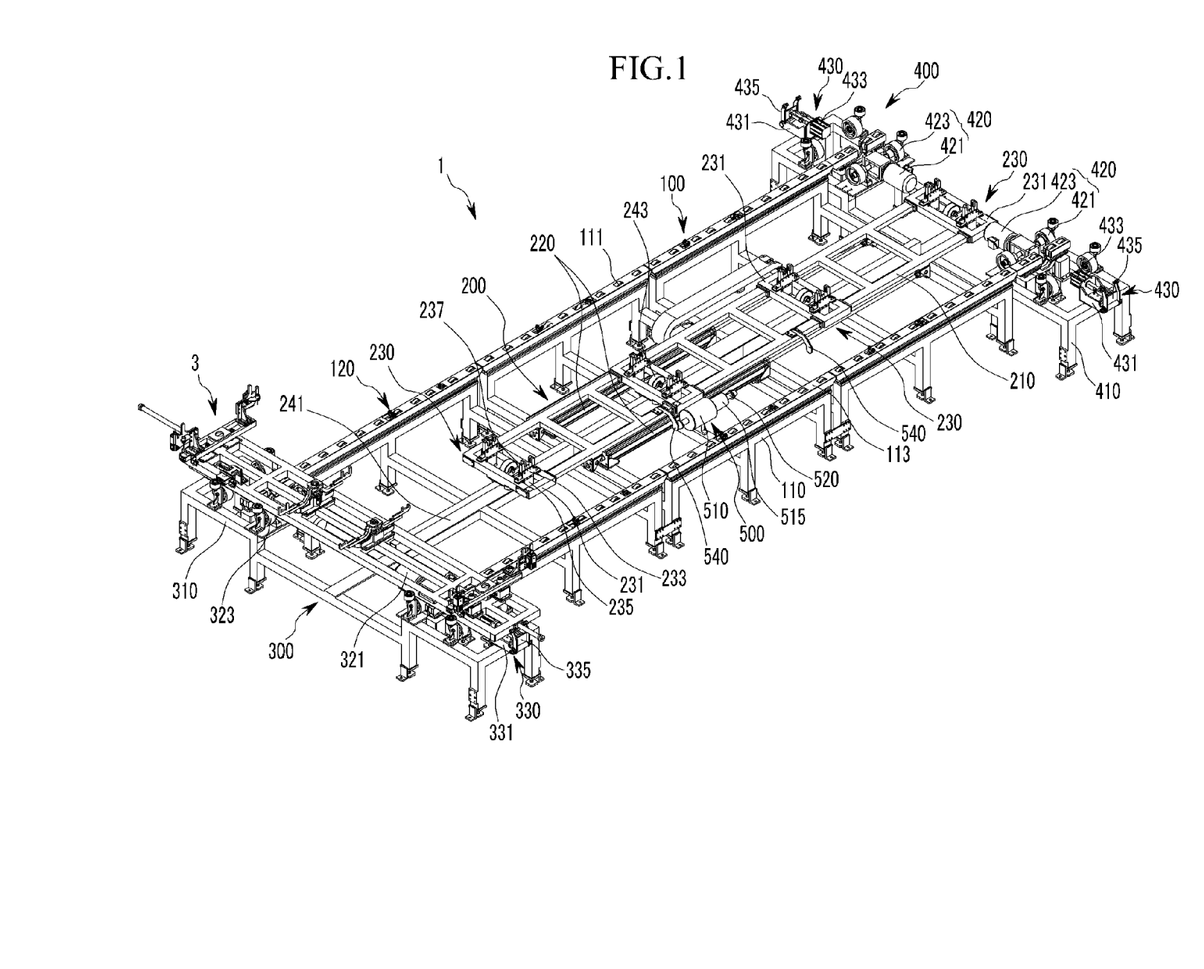
FIG. 1 is a perspective view of a traverse system according to an exemplary embodiment of the present invention.
Figure 2:
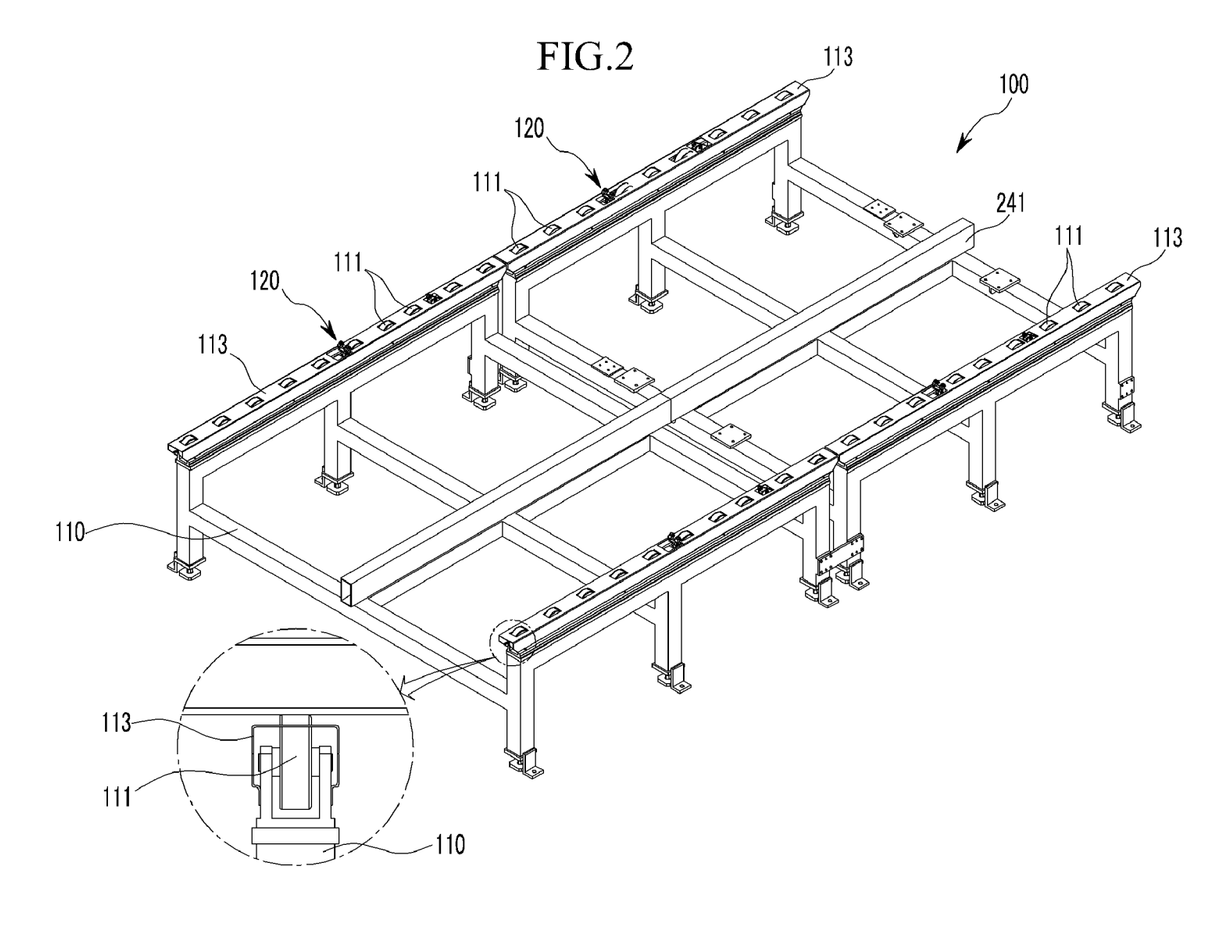
FIG. 2 is a perspective view of a shuttle unit according to an exemplary embodiment of the present invention.

FIG. 1 is a perspective view of a traverse system according to an exemplary embodiment of the present invention, and FIG. 2 is a perspective view of a shuttle unit according to an exemplary embodiment of the present invention.

Referring to FIG. 1 and FIG. 2, a traverse system 1 according to an exemplary embodiment of the present invention includes a shuttle unit 100 for transporting a moving cart 3 to working lines (not shown) and a moving unit 200 for transporting the moving cart 3 on the shuttle unit 100.

The shuttle unit 100, as shown in FIG. 2, includes a base frame 110, a roller 111 and a cover plate 113.

The base frame 110 is disposed along moving direction of the moving cart 3 on a floor.

A plurality of rollers 111 are rotatably disposed on the base frame 110 along length direction of the base frame 110.

A cover plate 113 is disposed on the base frame 110 and through which the rollers 111 are protruded.

Figure 3:
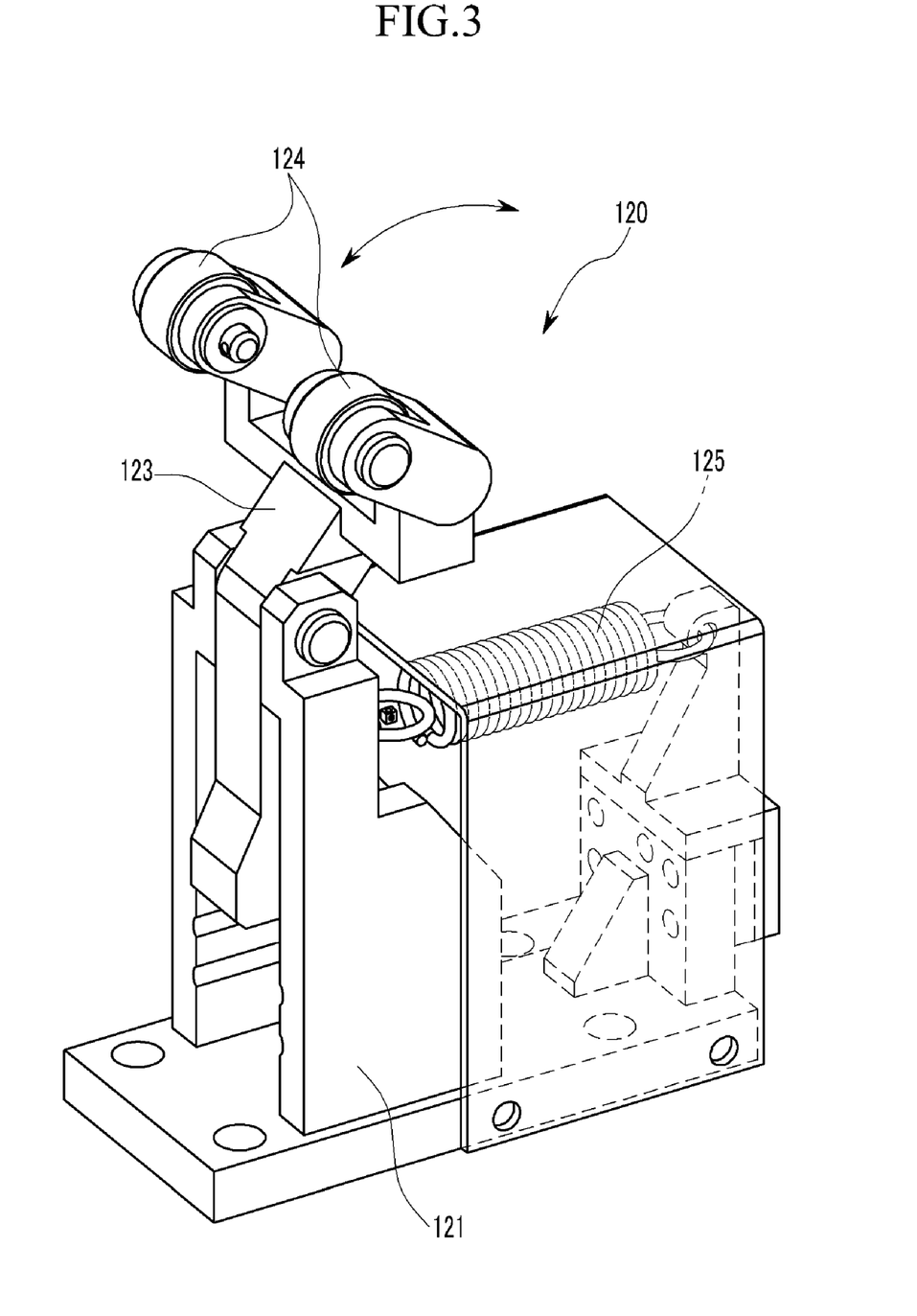
FIG. 3 is a perspective view of a floating stopper unit according to an exemplary embodiment of the present invention.

FIG. 3 is a perspective view of a floating stopper unit according to an exemplary embodiment of the present invention.

Referring to FIG. 3, a plurality of floating stopper units 120 are disposed on the shuttle unit 100 and the floating stopper units 120 temporarily fix the moving cart 3 transported by the moving unit 200 on the base frame 110.

The floating stopper unit 120, as shown in FIG. 2 and FIG. 3, includes a fixing block 121, a stopper 123 and an elastic member 125.

The fixing blocks 121 are disposed apart from each other on the base frame 110.

The stopper 123 is hingedly connected to the fixing block 121 and a contact roller 124 is configured to an end of the stopper 123 for contacting the moving cart 3.

It is preferable that the stopper 123 is protruded from the cover plate 113.

It is also preferable that the contact roller 124 is made of soft material, such as urethane, for reducing noise.

The elastic member 125 connects the fixing block 121 and the stopper 123 for supplying elastic force to the stopper 123.

The elastic member 125 is connected to an end of the stopper 123 and an inside part of the fixing block 121.

The floating stopper unit 120 temporarily stops the moving cart 3 when the moving cart 3 transported by the moving unit 200 is arrived on the shuttle unit 100.

When the moving cart 3 contacts the contact roller 124, the floating stopper unit 120 temporarily stops the moving cart 3, and then the stopper 123 rotates around the fixing block 121 when the moving cart 3 is transported by the moving unit 200, and the stopper 123 then rotates to its original position by the elastic force of the elastic member 125.

Figure 4:
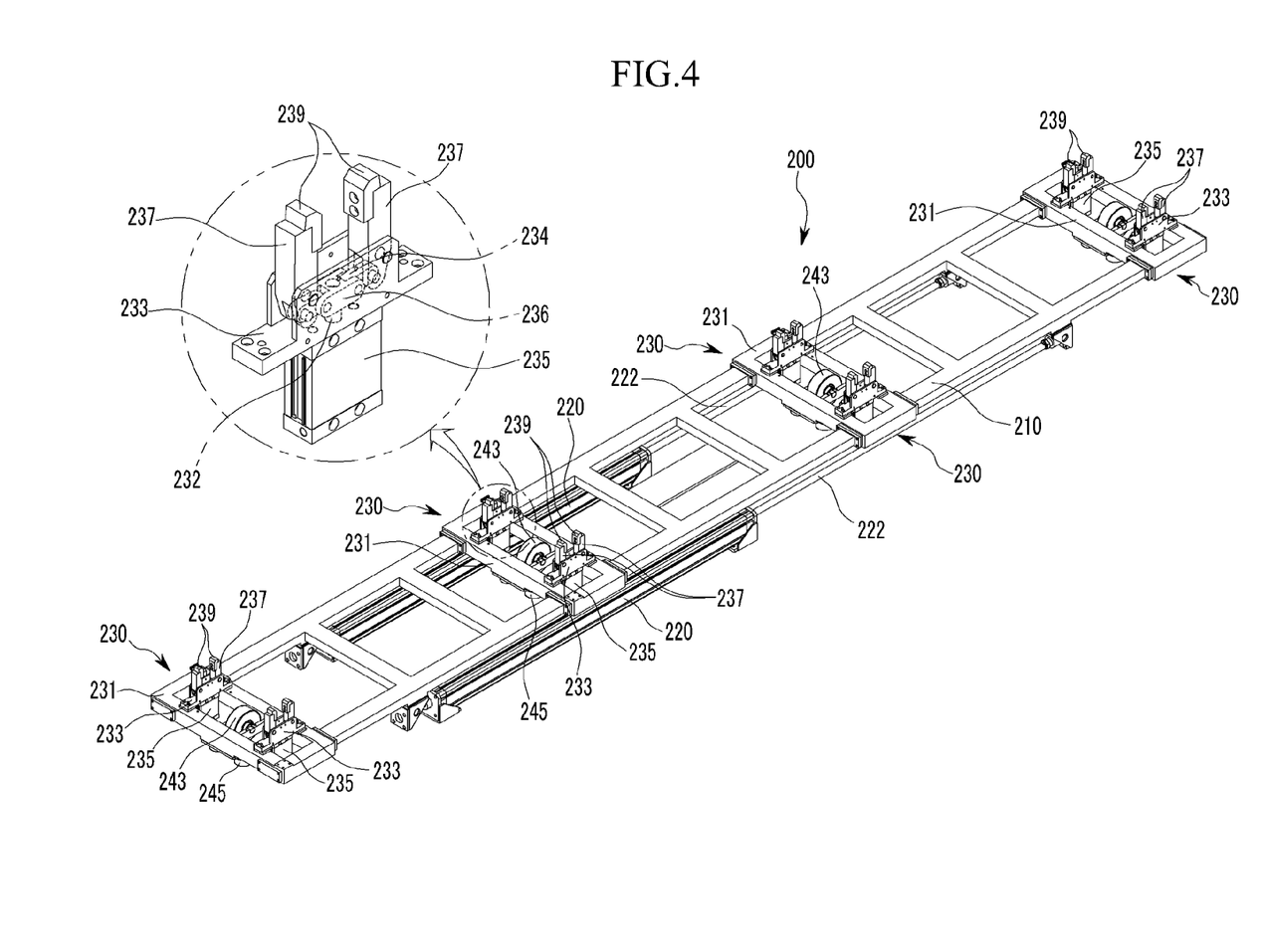
FIG. 4 is a perspective view of a moving unit according to an exemplary embodiment of the present invention.

FIG. 4 is a perspective view of a moving unit according to an exemplary embodiment of the present invention.

The moving unit 200 of the present exemplary embodiment, as shown in FIG. 4, includes a moving frame 210, a moving cylinder 220 and a plurality of moving cart clamping units 230.

The moving frame 210 is disposed on the shuttle unit 100 for reciprocating along the base frame 110.

The moving cylinder 220 includes a moving cylinder rod 232 connected to the moving frame 210 and the moving cylinder 220 disposed on the base frame 110.

It is preferable that the moving cylinder 220 is a double rod cylinder that operates the clamping cylinder rod 232 forward and rearward along length direction of the moving cylinder 220.

The moving cart clamping units 230 can clamp the moving cart 3 and transport the moving cart 3 on the shuttle unit 100 and, for instance, four moving cart clamping units 230 are disposed on the moving frame 210 in the present exemplary embodiment.

Each of the moving cart clamping units 230 includes a mounting frame 231, a mounting block 233, a clamping cylinder 235, a moving cart clamper 237 and a clamping pad 239.

The mounting frames 231 are disposed apart from each other on the moving frame 210.

The mounting blocks 233 are configured to the mounting frames 231.

In the present exemplary embodiment, the clamping cylinder 235 includes a clamping cylinder rod 232 and is disposed under the mounting block 233.

The moving cart clamper 237 is disposed as a pair, and hingedly connected to the mounting block 233 and of which a lower part is hingedly connected to a first link 234, wherein the first link 234 is hingedly conned to a second link 236, which is connected to the clamping cylinder rod 232.

The clamping pads 239 are provided inside the moving cart clamper 237 for stably clamping the moving cart 3.

The moving cart clamping unit 230 may clamp the moving cart 3 by the moving cart clamper 237, which rotates according to forward and rearward operation of the clamping cylinder 235.

The term "forward operation" of the cylinder herein refers to protruding movement of the rod from the cylinder and the term "rearward operation" of the cylinder refers to inserting movement of the rod to the cylinder.

In the rearward operation of the clamping cylinder 235, the moving cart clamper 237 clamps the moving cart 3 and clamping of the moving cart 3 is released in the forward operation of the clamping cylinder 235.

Figure 5:
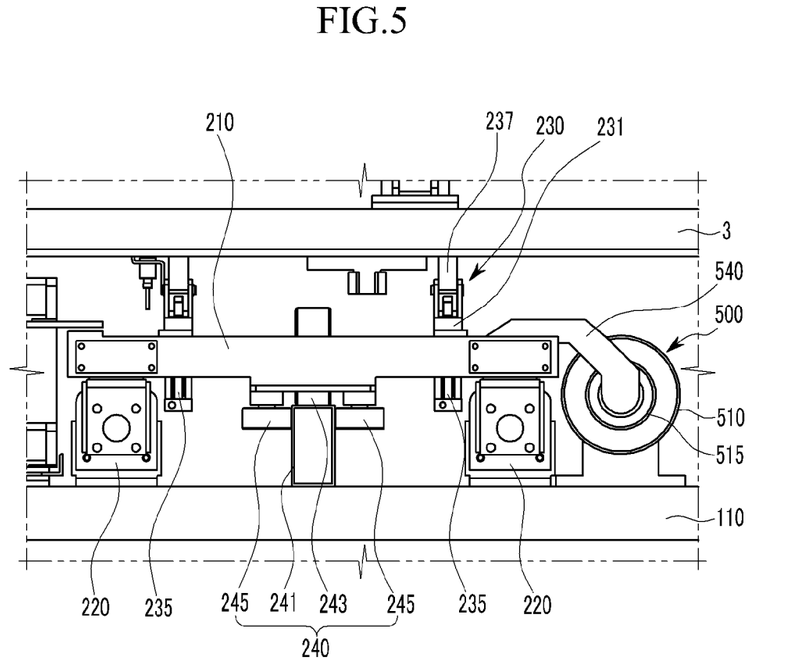
FIG. 5 is a side view of a moving unit according to an exemplary embodiment of the present invention.

FIG. 5 is a side view of a moving unit according to an exemplary embodiment of the present invention.

As shown in FIG. 5, a guide unit 240 for guiding the moving frame 210 is disposed between the shuttle unit 100 and the moving unit 200.

The guide unit 240 includes a guide beam 241, an upper guide roller 243 and a side guide roller 245.

The guide beam 241 is disposed along length direction of the base frame 110.

The upper guide roller 243 is formed to the mounting frame 231 and contacts an upper portion of the guide beam 241.

The side guide roller 245 is formed to the mounting frame 231 and contacts a side portion of the guide beam 241.

With the above-described structure, the guide unit 240 may stably guide the moving frame 210 on the base frame 110.

Figure 6:
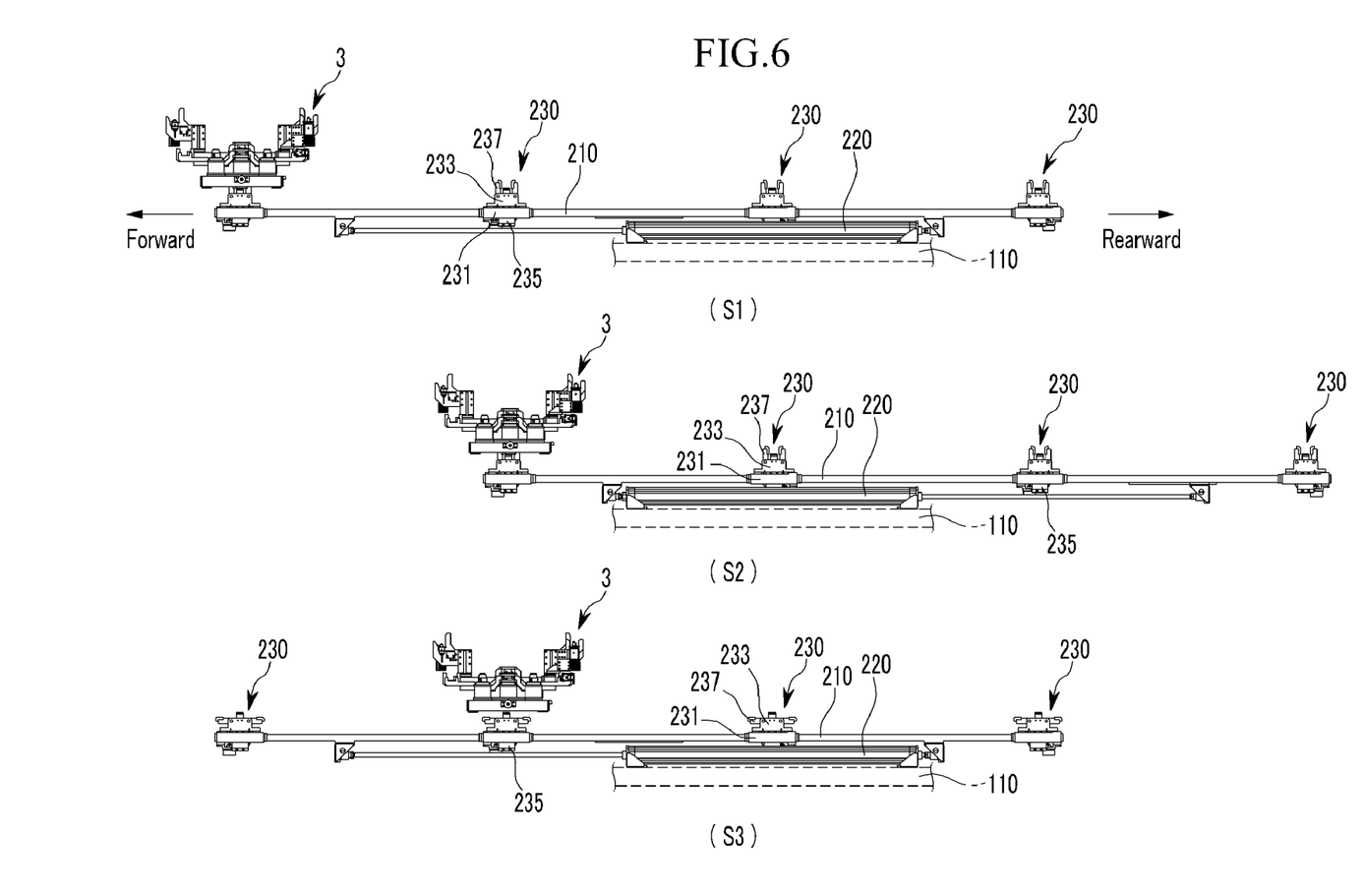
FIG. 6 shows operating states of a moving unit according to an exemplary embodiment of the present invention.

FIG. 6 is drawing showing operating states of a moving unit according to an exemplary embodiment of the present invention.

Referring to FIG. 6, the moving frame 210 is moved by the forward operation of the moving cylinder 220 in S1.

The term "forward operation" of the moving cylinder 220 herein means that the moving frame 210 moves to the first ejecting unit 300, and the term "rearward operation" of the moving cylinder 220 means that the moving frame 210 moves to the second ejecting unit 300 in FIG. 1.

When the first moving cart clamping unit 230 of the left side in the drawing is positioned under the moving cart 3, the moving cart clamper 237 clamps the moving cart 3 by the rearward operation of the clamping cylinder 235.

After clamping the moving cart 3, the moving frame 210 with the moving cart 3 is moved rearward direction by the rearward operation of the moving cylinder 220 in S2.

After that, clamping of the moving cart 3 is released, and the moving cart 3 is positioned on the base frame 110.

The moving frame 210 is then moved by the forward operation of the moving cylinder 220 with rearward operation of the clamping cylinder 235 as shown in S3 of FIG. 6, Thereafter, second moving cart clamping unit 230 of the left side in the drawing is positioned under the moving cart 3.

Then the moving cart clamper 237 clamps the moving cart 3 by the rearward operation of the clamping cylinder 235.

After clamping the moving cart 3, the moving frame 210 with the moving cart 3 is moved rearward direction by the rearward operation of the moving cylinder 220 similar to S2.

The moving unit 200 repeats the above steps with forward and rearward operations of the moving cylinder 220 and the moving cart 3 is transported on the shuttle unit 100.

Figure 7:
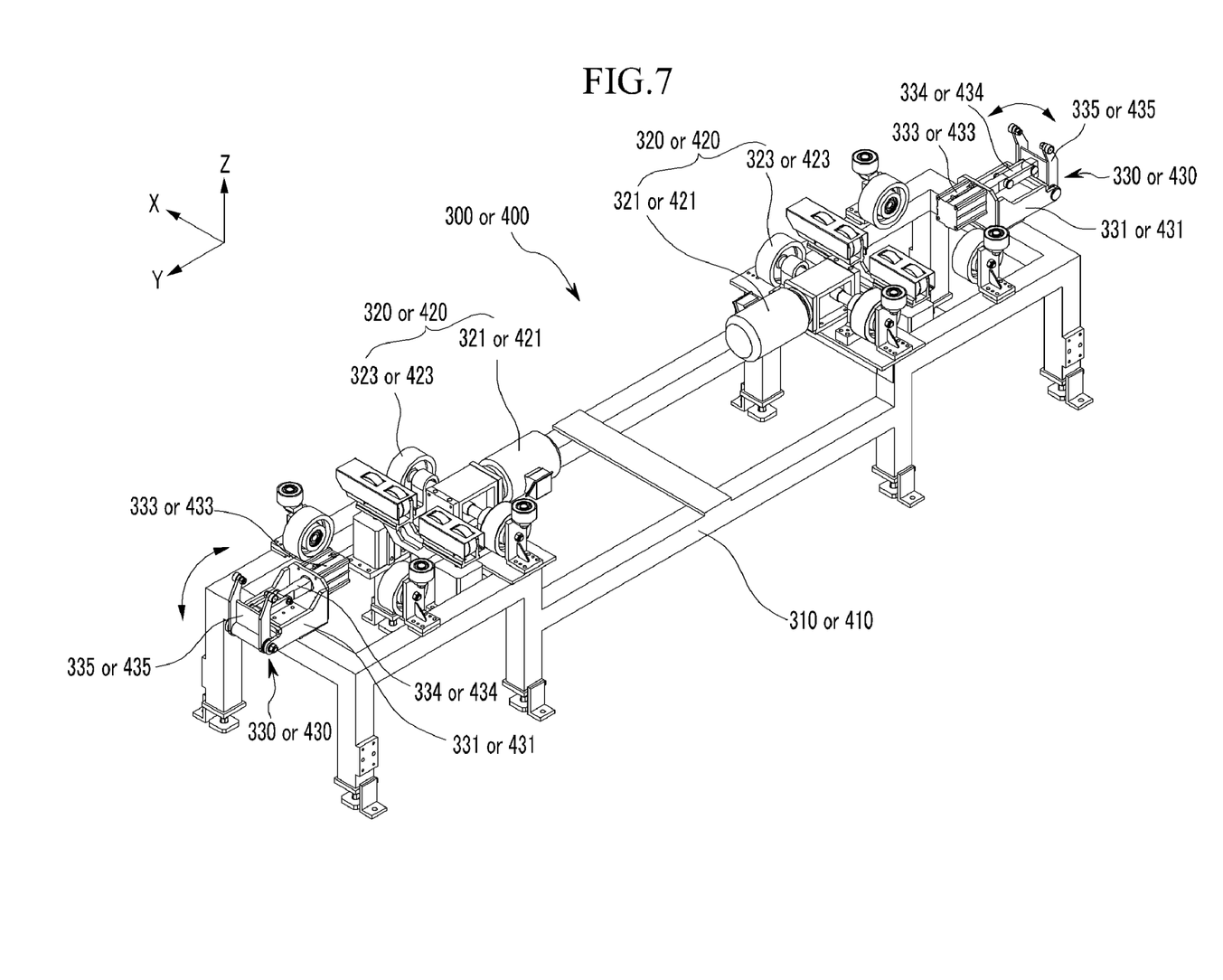
FIG. 7 is a perspective view of a first and second ejecting unit according to an exemplary embodiment of the present invention.

FIG. 7 is a perspective view of a first and second ejecting unit according to an exemplary embodiment of the present invention.

Referring to FIG. 1 and FIG. 7, the traverse system may further include first and second ejecting units 300 and 400 that is perpendicularly or substantially perpendicularly disposed to the ends of the base frame 11 and respectively transports the moving cart 3 to and from the shuttle unit 100.

The first and second ejecting units 300 and 400 include first and second fixing frames 310 and 410 and first and second driving units 320 and 420 respectively.

The first and second fixing frames 310 and 410 are disposed to the end of the base frame 110.

The first and second driving units 320 and 420 include first and second driving motors 321 and 421 disposed to the first and second fixing frames 320 and 420, respectively, and first and second driving rollers 323 and 423 connected to the first and second driving motors 321 and 421 for transporting the moving cart 1 to and from the first and second fixing frames 310 and 410.

The first and second ejecting units 300 and 400 further include first and second moving cart holding units 330 and 430 that are disposed to ends of the first and second fixing frames 310 and 410 respectively for the moving cart 3 to be positioned on the first and second fixing frames 310 and 410 respectively.

The first and second moving cart holding units 330 and 430 include first and second locators 331 and 431, first and second holding cylinders 333 and 433 and first and second holding clampers 335 and 435, respectively.

The first and second locators 331 and 431 are provided to the ends of the fixing frames 310 and 410, respectively.

The first and second holding cylinders 333 and 433 include holding cylinder rods 334 and 434 and are disposed to the first and second locators 331 and 431, respectively.

The first and second holding clampers are hingedly connected to an end of the holding cylinder rods 334 and 434 and the locators 331 and 431, respectively.

When the holding cylinder rods 334 and 434 are forwardly operated, the moving cart 3 can be transported to or from the first and second ejecting units 300 and 400 and when the holding cylinder rods 334 and 434 are rearwardly operated, the moving cart 3 can be stably positioned on the first and second ejecting units 300 and 400.

Figure 8:
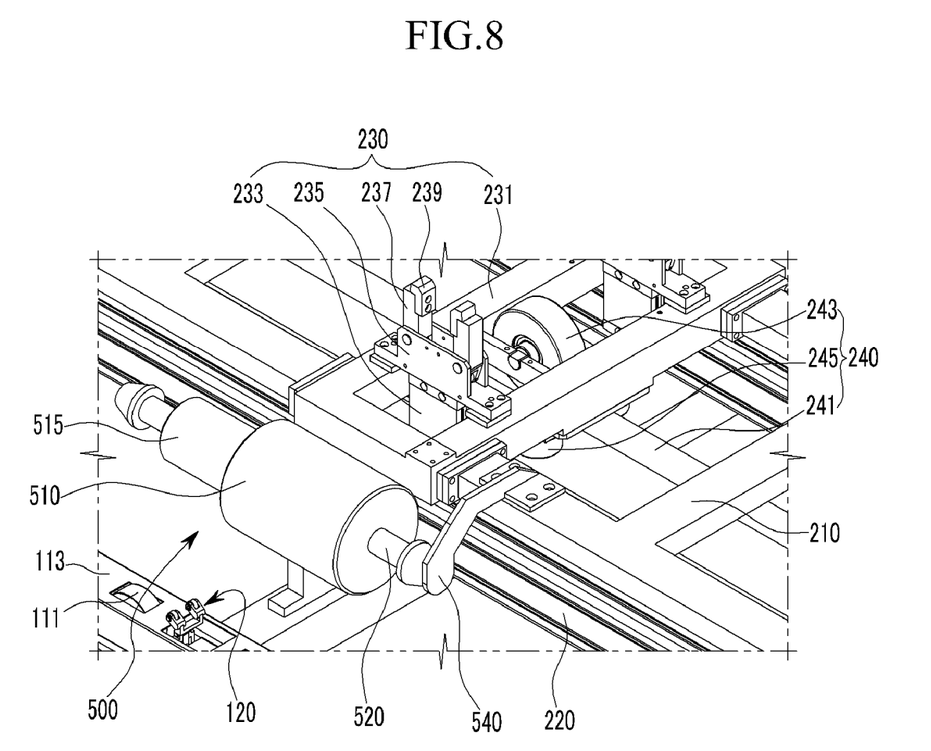
FIG. 8 is a perspective view of a damping unit according to an exemplary embodiment of the present invention.
Figure 9:
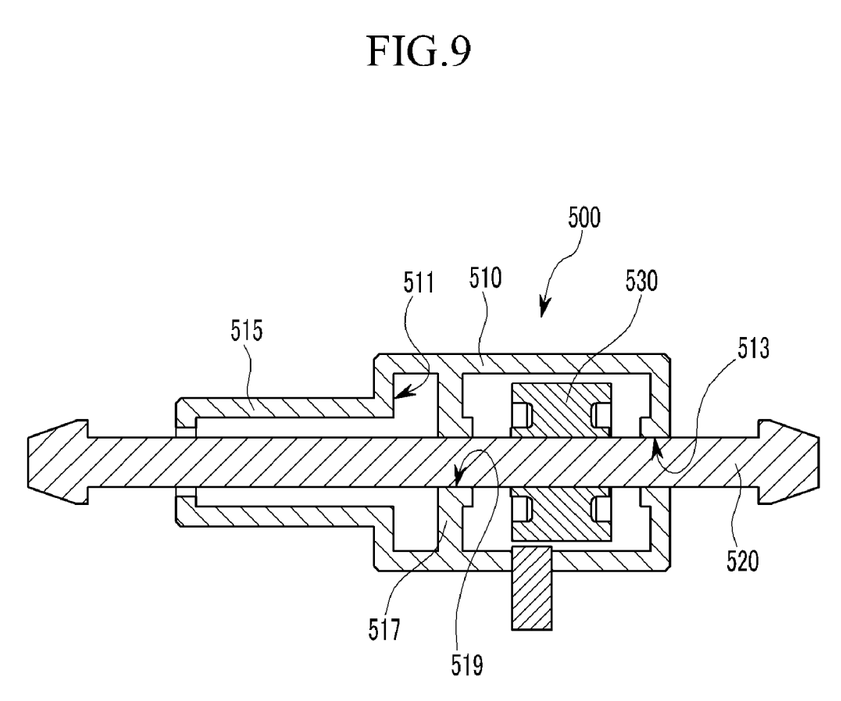
FIG. 9 is a cross-sectional view along line A-A of FIG. 8.
Figure 10:
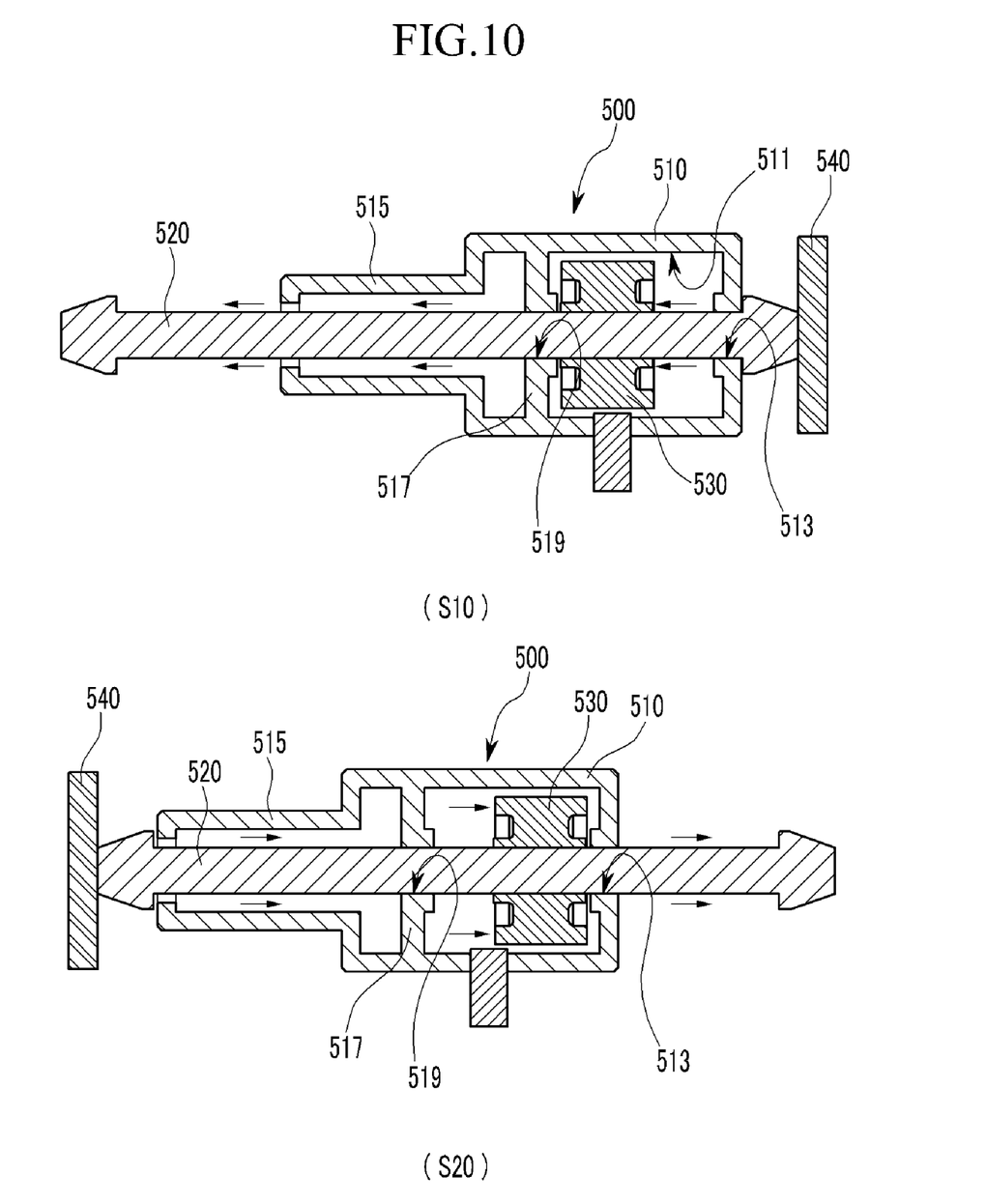
FIG. 10 shows operating states of a damping unit according to an exemplary embodiment of the present invention.

FIG. 8 is a perspective view of a damping unit according to an exemplary embodiment of the present invention, FIG. 9 is a cross-sectional view along line A-A of FIG. 8, and FIG. 10 is drawing showing operating states of a damping unit according to an exemplary embodiment of the present invention.

Referring to FIG. 8 to FIG. 10, the traverse system 1 may further include a damping unit 500 that is disposed to the base frame 110 for reducing impact transported from the moving cylinder 220 to the moving frame 210 when the moving unit 200 reciprocates.

The damping unit 500, as shown in FIG. 8 and FIG. 9, includes a housing 510, an absorber rod 520 and an absorber 530.

The housing 510 is shaped as a cylinder and has an inner space 511 therein. An insertion hole 513 is formed to the housing 510 and the housing 510 is disposed to the base frame 110.

A protruding portion 515 is protruded from one side of the housing 510 and a partition 517 for forming the inner space 511 is formed in the housing 510.

A penetration hole 519 for inserting the absorber rod 520 therein is formed in the partition 517.

Ends of the absorber rod 520 are protruded through the insertion hole 513 of the housing 510 and the penetration hole 519 of the partition 517 and the absorber rod 520 is slidable within the insertion hole 513 and the penetration hole 519.

The absorber 530 is slidably connected with the absorber rod 520 in the inner space 511 of the housing 510.

It is preferable that the absorber 530 is made of soft materials.

The damping unit 500 further includes a contact bracket 540 disposed to the moving frame 210 for contacting the end of the absorber rod 520 to be slided.

The contact bracket 540 contacts the ends of the absorber rod 520 when the moving frame 210 reciprocates so that the absorber rod 520 moves in the housing 510.

The first friction force between the absorber rod 520 and the insertion hole 513 or the penetration hole 519 can reduce impact induced by the operation of the moving cylinder 220.

In the mean while, the absorber 530 slides with the absorber rod 520 in the inner space 511 of the housing 510 and contacts the partition 517 or the housing 510 and then just the absorber rod 520 slides.

Then the absorber rod 520 slides within the absorber 530 so that secondary frictional force is caused to reduce impact induced by the operation of the moving cylinder 220.

Thus, the damping unit 500 can reduce impact induced by the operation of the moving cylinder 220 so that the moving frame 210 stably moves and durability of the moving cylinder 220 can be improved.

Referring to FIG. 10, operating states of a damping unit 500 will be described.

The moving frame 210 is moved in right direction in the drawing by the forward operation of the moving cylinder 220 and the absorber rod 520 contacts the right contact bracket 540.

Then the absorber rod 520, as shown in S10 of FIG. 10, moves to the left.

The absorber rod 520 slides within the insertion hole 513 and the penetration hole 519, and the first frictional force occurs when the absorber 530 slides with the absorber rod 520 in the inner space 511 of the housing 510.

Then the absorber rod 520 slides within the absorber 530 so that secondary frictional force occurs to reduce impact induced by the operation of the moving cylinder 220.

When the moving frame 210 is moved in left direction in the drawing by the rearward operation of the moving cylinder 220 and the absorber rod 520 contacts the left contact bracket 540.

Then the absorber rod 520, as shown in S20 of FIG. 10, moves to the right.

The absorber rod 520 slides within the insertion hole 513 and the penetration hole 519 and the first frictional force occurs when the absorber 530 slides with the absorber rod 520 in the inner space 511 of the housing 510.

Then the absorber rod 520 slides within the absorber 530 so that secondary frictional force occurs to reduce impact induced by the operation of the moving cylinder 220.

Hereinafter, operation of the traverse system according to an exemplary embodiment of the present invention will be described with reference to FIG. 11.

Figure 11:
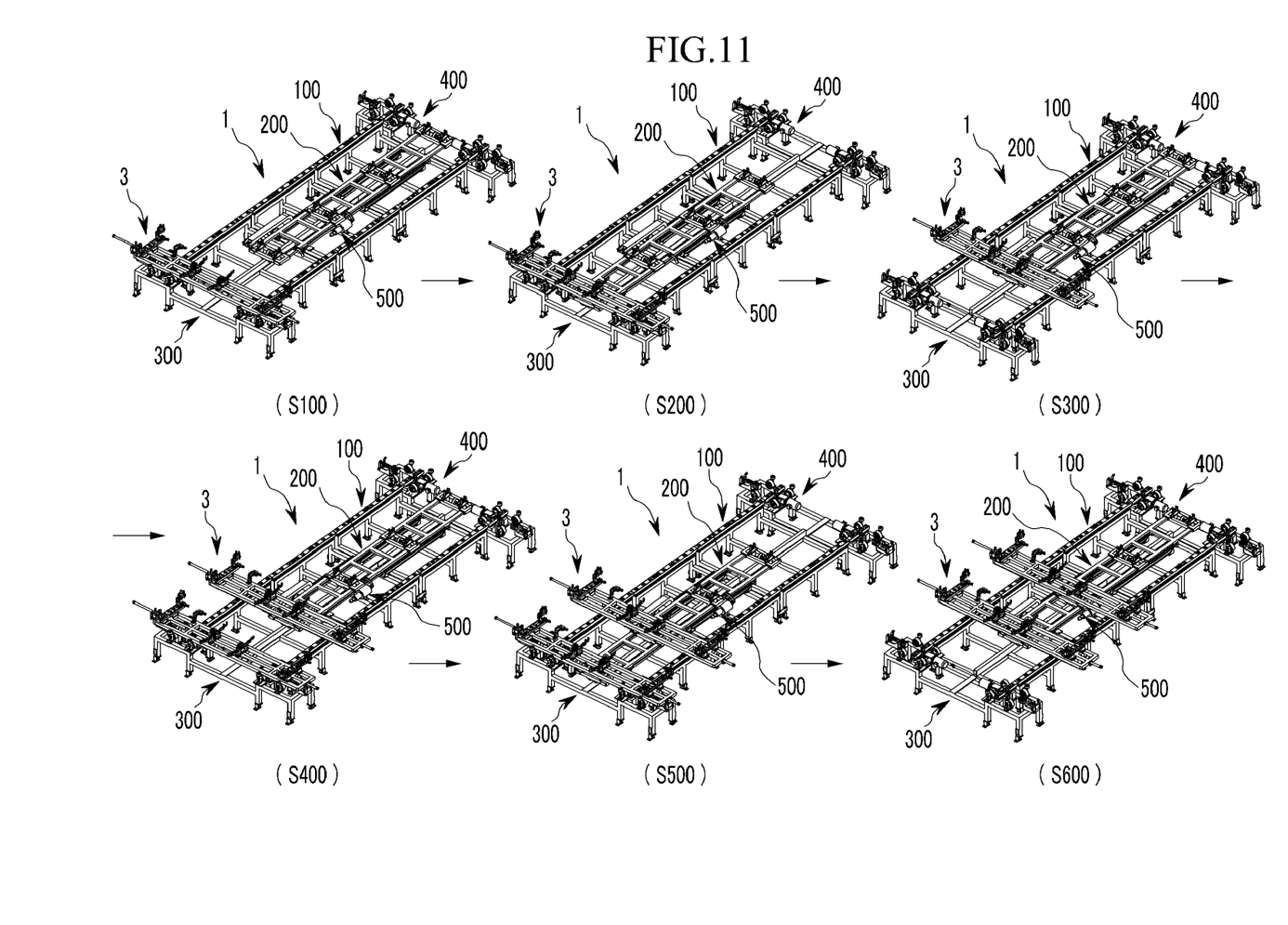
FIG. 11 shows operating states of a traverse system according to an exemplary embodiment of the present invention.

The moving cart 3, as shown in S100 of FIG. 11, is moved to the first fixing frame 310 by rolling movement of the first driving roller 323 operated by the first driving motor 321.

When the moving cart 3 is positioned on the first fixing frame 310, the first holding cylinder 333 of the first moving cart holding unit is rearwardly operated.

Then the holding clamper 335 rotates around the first locator 331 so that the moving cart 3 is stably positioned on the first fixing frame 310.

After that, the moving cylinder 220, as shown S200, is forwardly operated so that the moving frame 210 is moved toward the moving cart 3.

After the first moving cart clamping unit 230 is positioned under the moving cart 3 on the first ejecting unit 300, the operation of the moving cylinder 220 stops.

In the above operation, the clamping cylinder 235 is forwardly operated in order to prevent the moving cart clamper 237 from interfering with the moving cart 3.

When the first the moving cart clamping unit 230 is positioned under the moving cart 3, the clamping cylinder 235 is rearwardly operated.

Then the moving cart clamper 237 rotates and clamps the moving cart 3 by the first and second links 234 and 236.

The clamping pads 239 stably clamp the moving cart 3.

And then, as shown in S300, the moving frame 210 is moved by the rearward operation of the moving cylinder 220.

The moving cart 3 clamped by the moving cart clamping unit 230 moves with the moving frame 210.

The guide unit 240 may stably guide the moving frame 210 on the base frame 110 with the upper guide roller 243 and the side guide roller 245.

In this movement, the moving cart 3 is supported by the rollers 111 of the shuttle unit 100 so that the moving cart 3 is prevented from being bent.

And then the moving cart 3 is positioned on the shuttle unit 100 by the floating stopper unit 120 after finishing operation of the moving cylinder 220.

At the same time, the second moving cart 3 is positioned by the first ejecting unit 300 as shown in S100.

The clamping of the moving cart clamping unit 230 is then released, and the moving cylinder 220, as shown in S500, is forwardly operated to transport the moving frame 210.

The first moving cart clamping unit 230 is positioned under the second moving cart 3 on the first ejecting unit 300 and the second moving cart clamping unit 230 is positioned under the first moving cart 3 on the shuttle unit 100.

Each moving cart clamping unit 230 clamps the each moving cart 3 respectively.

After clamping, the moving cylinder 220, as shown S600 of FIG. 11, rearwardly operated to transport the moving frame 210.

Two moving carts 3 clamped by the moving cart clamping unit 230 are transported toward the second ejecting unit 400 on the shuttle unit 100.

When the first moving cart 3 is transported, the stopper 123 rotates around the fixing block 121 and the contact roller 124 contacts the first moving cart 3, and then the stopper 123 returns to the original position by the elastic force of the elastic member 125 after the first moving cart 3 passes by the floating stopper unit 120.

After that the second moving cart 3 is positioned by the floating stopper unit 120 on the shuttle unit 100.

The floating stopper unit 120 repeats the above operations when the moving cart 3 is transported.

When the other moving cart 3 is moved to the first ejecting unit 300, the first ejecting unit 300 repeats the above operations.

The moving cart 3 is transported from the shuttle unit 100 to the second ejecting unit 400 and positioned on the second fixing frame 410 by the operation of the second moving cart holding unit 430.

Then the moving cart 3 on the second fixing frame 410 is transported to working lines (not shown) by the operation of the second driving unit 420 of the second ejecting unit 400.

In the above operations, the damping unit 500 reduces impact induced by the operation of the moving cylinder 220.

As described above, the traverse systems according to the exemplary embodiments of the present invention transport the moving cart 3 using the moving cylinder 220 of the moving unit 200 on the shuttle unit 100 so that the moving cart 3 can be transported stably and fast.

In addition, the traverse systems do not require additional guide units for stable transporting, such as a plurality of gear boxes, so that maintenance time and cost can be decreased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A traverse system for transporting a moving cart to working lines comprising:
    a base frame disposed along moving direction of the moving cart;
    a shuttle unit comprising a plurality of rollers which are rotatably disposed on the base frame and a cover plate which is disposed on the base frame and through which the rollers are protruded;
    a moving frame disposed on the shuttle unit for reciprocating along the base frame so as to transport the moving cart;
    a moving cylinder disposed on the base frame and comprising a moving cylinder rod connected to the moving frame;
    a plurality of mounting frames disposed apart from each other on the moving frame;
    a mounting block provided to the mounting frame;
    a clamping cylinder comprising a clamping cylinder rod and disposed under the mounting block;
    a moving cart clamper, which is hingedly connected to the mounting block and of which a lower part is hingedly connected to a first link, wherein the first link is hingedly connected to a second link, which is connected to the clamping cylinder rod; and
    a clamping pad provided inside the moving cart clamper.

2. The traverse system of claim 1, wherein the shuttle unit further comprises a plurality of floating stopper units which temporarily fix the moving cart transported by the moving unit on the base frame.

3. The traverse system of claim 2, wherein each of the floating stopper units comprises:
    a plurality of fixing blocks disposed apart from each other on the base frame;
    a stopper which is hingedly connected to the fixing block and a contact roller configured to an end of the stopper for contacting to the moving cart; and
    an elastic member that connects the fixing block and the stopper for supplying elastic force to the stopper.

4. The traverse system of claim 1, further comprising a guide unit that is disposed between the shuttle unit and the moving unit for guiding movement of the moving frame.

5. The traverse system of claim 4, wherein the guide unit comprises:
    a guide beam disposed along length direction of the base frame;
    an upper guide roller formed to the mounting frame and contacting an upper portion of the guide beam; and
    a side guide roller formed to the mounting frame and contacting a side portion of the guide beam.

6. The traverse system of claim 1, further comprising first and second ejecting units which are perpendicularly or substantially perpendicularly disposed to the ends of the base frame and transport the moving cart to and from the shuttle unit respectively, wherein the first and second ejecting units, respectively, comprise:
    first and second fixing frames disposed to the end of the base frame; and
    first and second driving units that comprise first and second driving motor disposed to the first and second fixing frames and first and second driving rollers connected to the first and second driving motors for transporting the moving cart to and from the first and second fixing frames.

7. The traverse system of claim 6, wherein the first and second ejecting units, respectively, further comprise first and second moving cart holding units that are disposed to ends of the first and second fixing frames for the moving cart to be positioned on the first and second fixing frames.

8. The traverse system of claim 7, wherein the first and second moving cart holding units, respectively, comprise:
    first and second locators configured to the ends of the fixing frame;
    first and second holding cylinders comprising a holding cylinder rod and disposed to the first and second locators; and
    first and second holding clampers hingedly connected to an end of the holding cylinder rod and the locator.

9. The traverse system of claim 1, further comprising a damping unit that is configured to the base frame for reducing impact induced by operation of the moving cylinder to the moving frame when the moving unit moves, wherein the damping unit comprises:
    a housing disposed to the base frame and provided with an insertion hole thereto;
    an absorber rod slidably inserted in the housing wherein ends of the absorber rod are protruded from the insertion hole; and
    an absorber that is slidably connected to the absorber rod in the housing.

10. The traverse system of claim 9, wherein the damping unit further comprises a protruding portion that is protruded from one side of the housing and a partition for forming inner spaces.

11. The traverse system of claim 9, wherein the damping unit further comprises a contact bracket disposed to the moving frame for contacting the end of the absorber rod to be slid.

* * * * *